United States Patent [19]

Westphal et al.

[11] 3,868,434

[45] Feb. 25, 1975

[54] POLYMER COMPOSITION AND PROCESS

[75] Inventors: Richard C. Westphal, Leominster; Paul Heinig, Bolton, both of Mass.

[73] Assignee: Foster Grant Co., Inc., Leominster, Mass.

[22] Filed: May 23, 1967

[21] Appl. No.: 640,478

Related U.S. Application Data

[63] Continuation-in-part of Ser. No. 457,794, May 21, 1965, abandoned, which is a continuation-in-part of Ser. No. 155,200, Nov. 27, 1961, abandoned, which is a continuation-in-part of Ser. No. 759,145, Sept. 5, 1958, abandoned.

[52] U.S. Cl............... 260/880 R, 260/892, 260/893
[51] Int. Cl....... C08f 1/60, C08f 29/08, C08f 29/34
[58] Field of Search..................... 260/880, 892, 893

[56] References Cited
UNITED STATES PATENTS

| | | | |
|---|---|---|---|
| 2,623,863 | 12/1952 | Dieckmann et al............. | 260/892 X |
| 2,694,692 | 11/1954 | Amos et al........................... | 260/880 |
| 2,886,553 | 5/1959 | Stein et al.......................... | 260/880 |
| 3,149,182 | 9/1964 | Porter................................. | 260/880 |
| 3,178,402 | 4/1965 | Smith et al......................... | 260/94.2 |
| 3,317,918 | 5/1967 | Foster................................. | 260/83.7 |

OTHER PUBLICATIONS

Industrial Engineering Chem., Vol. 57, No. 1, January 1965, p. 43.

*Primary Examiner*—Joseph L. Schofer
*Assistant Examiner*—Frank Cervi
*Attorney, Agent, or Firm*—Leroy G. Sinn; Joseph A. DeGrandi

[57] ABSTRACT

Impact vinyl aromatic polymer compositions are provided which comprise vinyl aromatic polymers reinforced by the incorporation or dispersion therein of at least one percent by weight on the total polymer weight of a polybutadiene having a cis butadiene content of at least 25 percent and a 1,2-addition butadiene content of not more than about ten percent. Processes for their production are also provided. These polymer compositions are useful in molding many consumer articles such as containers, refrigerator liners, sheet, trays, etc.

17 Claims, No Drawings

POLYMER COMPOSITION AND PROCESS

This application is a continuation-in-part of our co-pending U.S. application Ser. No. 457,794, filed May 21, 1965, now abandoned, which is a continuation-in-part of application Ser. No. 155,200, filed Nov. 27, 1961, now abandoned, which in turn is a continuation-in-part of application Ser. No. 759,145, filed Sept. 5, 1958, now abandoned.

This invention relates to improved polymer compositions. In particular, it relates to compositions of vinyl aromatic polymers improved by the incorporation of rubbery polymers as to, in illustration impact properties. More particularly, it relates to such styrene polymers including styrene in terpolymer compositions having high impact strengths.

Vinyl aromatic polymeric compositions are widely used for molding, e.g., for injection molding, etc., but for many purposes are unsatisfactory because of low impact resistance and other reasons. The impact resistance of polystyrene and other vinyl aromatic polymers has been enhanced by incorporation of certain rubbery polymers therein either by blending polymerized vinyl aromatic polymers with a rubber polymer or by polymerizing monomeric vinyl aromatic compounds in the presence of a rubbery material. These polymer molding compositions are known as high impact compositions; for example, if styrene is used as the monovinyl aromatic compound, high impact polystyrenes result. The use of such rubbery polymers has brought about an increase in the impact properties of the vinyl aromatic materials but not to the extent that it is considered desirable for many purposes. The rubbery polymers that have been previously used in conjunction with monomeric styrene or polystyrene or other vinyl aromatic compounds have included natural rubber and the synthetic unsaturated rubbery polymeric derivatives of conjugated 4–6 carbon atom diolefins, as for example, GR-S and butadiene-acrylonitrile rubbery polymers. Most of the high impact polystyrene commercialized in the past has utilized GR-S rubbers.

In accordance with the present invention, we have found that molding compositions of vinyl aromatic materials generally can be substantially improved for example, as regards impact resistance. This invention provides composition comprising polymers of a monovinyl aromatic monomer, the impact values of which have been substantially enhanced by the incorporation therein of an effective amount of at least one percent by weight based on the total polymer weight of a 1,4-polybutadiene having a cis content of at least 25 percent and a vinyl or 1,2-addition butadiene content of not more than about 10 percent. Desirable polymer compositions ordinarily comprise 80 – 99 percent of a polymer of a monovinyl aromatic monomer and 20 – 1 percent total rubbery polymer, said rubbery polymer comprising (a) at least 1 percent by weight of the total product of a 1,4-polybutadiene having a cis content of at least 25 percent and a vinyl or 1,2-addition content of not more than 10 percent and (b) up to 19 percent by weight of the total polymer weight of another rubbery polymer. Thus, the novel compositions can contain in some instances other rubbery polymers in place of a portion of the noted 1,4-polybutadiene, such combinations of rubbery polymers providing at times advantageous properties in the compositions.

The compositions of this invention can be prepared as by the novel freeradical polymerization methods provided hereby or by mechanical blending techniques. Thus, the rubbery polymers can be blended with polymerized vinyl aromatic materials, or a composition may and preferably is, generally speaking, formed by free-radical polymerization of the vinyl aromatic monomer in the presence of the rubber polymers employing bulk, solution, suspension, or emulsion polymerization techniques.

The vinyl aromatic monomers employed in this invention include styrene and its derivatives such as halostyrene, alkyl substituted styrenes, aryl substituted styrenes, vinyl derivatives of naphthalene, and the like. Specific examples of such vinyl aromatic monomers include vinyl toluene, bromo styrenes, phenyl styrenes, vinyl naphthalenes, chlorovinyl naphthalenes, and vinyl phenanthrenes. Alpha-substituted vinyl aromatic compounds can also be utilized, especially in combination with the polymerizable vinyl aromatic compounds having no alpha substituent. In addition, the vinyl aromatic monomers employed may be used alone or in combination with any suitable amount of one or combinations of esters of acrylic or methacrylic acid, acrylonitrile and esters of itaconic acid. These comonomers can constitute up to 80 percent, preferably about 10 percent to about 30 percent, of the final polymer weights. For example, styrene copolymers such as styrene-acrylonitrile copolymers, copolymers of styrene and esters of acrylic or methacrylic acid, and copolymers of styrene and esters of itaconic acid may be employed in blended materials. Similarly, following polymerization techniques, monomer combinations of one or more styrenes with esters of acrylic and methacrylic acid, acrylonitrile, and/or esters of itaconic acid can be polymerized in the presence of the rubbery polymers. The esters of acrylic and methacrylic acid useful in our invention include methylmethacrylate, ethylmethacrylate, butylmethacrylate, ethylbenzyl methacrylate, stearyl methacrylate, etc., and the corresponding acrylates. The esters of itaconic acid employable in this invention include dimethyl itaconate, diethyl itaconate, dibutyl itaconate, etc.

The rubbery polymers which may be employed in this invention in conjunction with the high cis content, low vinyl content 1,4-polybutadiene as hereinabove defined include natural rubber and synthetic unsaturated rubbery polymeric derivatives of conjugated 4–6 carbon atom diolefins, for example, rubbery copolymers such as butadiene and styrene, acrylonitrile and butadiene, isoprene and styrene, acrylonitrile and isoprene and 2,3-dimethyl butadiene and styrene copolymers, polyisoprene, polychloroprene, etc.

1,4-polybutadiene having such high cis content and low vinyl content can be prepared by the use of heterogeneous catalysts, such as a chromium compound absorbed on alumina and silica, aluminum tri-alkyl with a metal halide such as titanium chloride, titanium iodide, and the like halides, organolithium, etc. The particular method of forming the 1,4-polybutadiene can vary so long as it suitably provides 1,4-polybutadienes having cis content of at least 25 percent and vinyl content of not more than about 10 percent. Such polymerizations are normally carried out in a hydrocarbon medium. Typical high cis content, low vinyl content stereoregular 1,4-polybutadienes utilized in this invention comprise about 25 to 95 percent and beyond to 100 percent cis content, about 0–70 percent trans content and not more than about 10 percent vinyl content.

In addition to the required minimum content of 1 percent high cis 1,4-polybutadienes having low vinyl contents, the remainder of rubbery content can be under this invention another rubbery polymer such as natural rubber, synthetic unsaturated rubbery polymeric derivatives of the conjugated 4–6 carbon atom diolefins or mixtures thereof.

In the following examples, comparative data are shown for varying amounts of vinyl aromatic monomers and rubbery polymers. It will be noted that where an equivalent amount of high cis content, low vinyl content polybutadiene is substituted for conventional rubbery butadiene-styrene copolymer or emulsion polybutadiene, the impact strengths of the resultant products are greatly increased and that where intermediate amounts are employed, an intermediate increase in impact strength results.

Other advantages besides enhanced impact values at various temperatures have been surprisingly observed for the impact polymer compositions provided hereby. For example, objects have been molded from the compositions having improved surfaces, e.g., both as to smoothness and gloss. It has been observed that parts can be provided using these impact compositions which show significant enhancement of heat distortion temperatures, creep rupture times and flex modulus values, without sacrifice in impact values. Another observation, as shown by Example 26 hereof, has been that the impact compositions provided by this invention have demonstrated greatly reduced retentivity of water, as in the case where the final polymer compositions are provided in the form of beads or granules by aqueous suspension polymerization. This lower retentivity of water property is important since the retained water must be at a very low level prior to actual molding of useable objects therefrom.

Small particles of the polymer compositions provided hereby can be rendered expandable by incorporation therein of an amount of a liquid blowing agent having a boiling point in the range of about 10° to 100° C. Desirably, about 2 to 10 percent of the blowing agent depending on the polymer, blowing agent, etc., can be employed. The blowing agent can be incorporated by known methods, such as by impregnation of the particles or by polymerization in the presence of the blowing agent, in order to provide expandable particles of the polymer compositions with the blowing agent evenly distributed throughout the particles. The blowing agent is desirably an aliphatic hydrocarbon such as pentane, cyclopentane, heptane, petroleum ether, and the like. The blowing agent can be selected from other hydrocarbons such as lower halogenated hydrocarbons, for example, methylene chloride, halogen substituted ethanes, etc. The expandable particles can be formed into foam articles by known procedures such as close molding procedures.

In the following examples, parts are recited as parts by weight of the total polymer composition and viscosities are recited for 8 percent by weight solutions of the final compositions in toluene at 25° C.

EXAMPLE 1

In a suitable vessel 117.6 parts of a rubbery copolymer of butadiene and styrene are added with stirring to 1818.9 parts of styrene monomer. The solution is agitated until a homogeneous mixture is formed. Dissolved in 40 parts by weight of styrene monomer, are 1.2 parts of benzoyl peroxide and 0.16 parts by weight of mercaptan modifier, which is added to the homogeneous mixture. After these ingredients are dispersed, the agitation is continued but the temperature is raised to and maintained at 80° C. for 4 hours. The temperature is then lowered to and is maintained at 75° C. for an additional three hours. The reaction mass is removed from the mixing vessel and is placed in a closed container for 17 hours at 100° C. and 17 hours at 150° C. Five parts by weight of stearic acid and two parts of alkylated aryl phosphite are evenly blended into the above mixture.

EXAMPLE 2

A rubbery copolymer of butadiene-styrene (GR-S) in an amount of 58.8 parts by weight, 58.8 parts by weight of a 1,4-polybutadiene of approximately 80 percent cis content, 8 percent trans-polymer content, 5 percent vinyl content and 23.5 parts by weight of polystyrene fines are blended at room temperature until a homogeneous mixture is formed. Then, while continuing agitation, 1818.9 parts by weight of styrene monomer are added until a uniform mixture is obtained. With continued agitation, identical amounts of the same ingredients as added to the homogeneous monomer mixture in Example 1 hereof, are added under the same conditions and the mass is further treated as in Example 1.

EXAMPLE 3

This example is identical with Example 1 except that 117.6 parts by weight of the high cis 1,4-polybutadiene described in Example 2 are substituted for the GR-S rubber employed in Example 1.

EXAMPLE 4

This example is identical to Example 1 except that 40 parts of the high cis 1,4-polybutadiene described in Example 2 are substituted for the GR-S rubber employed in Example 1.

EXAMPLE 5

This example is identical to Example 1 except that 208 parts of the high cis 1,4-polybutadiene described in Example 2 are substituted for the GR-S rubber employed in Example 1.

The physical properties of the resultant products of the above five examples are composed as follows:

|  | Ex. 1 | Ex. 2 | Ex. 3 | Ex. 4 | Ex. 5 |
|---|---|---|---|---|---|
| Volatility (%) | 0.30 | 0.78 | 0.40 | 0.20 | 1.40 |
| Viscosity (8% sol.) | 36.0 | 100. | 21.1 | 15.0 | 100. |
| Impact Strength* | 0.88 | 1.20 | 1.63 | 0.70 | 2.56 |
| % gel | 4.76 | 8.51 | 1.81 | 1.30 | 7.10 |
| Heat Distortion (°C. at 264 p.s.i.) 10½× ¼″ bars | 78.5 | 75.0 | 78.0 | 83.0 | 72.5 |
| Mold Diagram Temp. (°F. at 400 p.s.i.) | 700. | 700. | 700. | 620. | 700. |

*The standard Izod test (ASTM D 256–56) is employed in all the examples using ½″ × ¼″ injection molded bars, unless otherwise noted, the results being in ft.-lbs./inch of notch.

EXAMPLE 6

Into a suitable reaction vessel at room temperature are added with stirring 121.8 parts of a rubbery copolymer of butadiene and styrene (having a butadiene to styrene ratio of approximately 76.5 to 23.5) and 1840.5 parts of styrene monomer. The solution is agitated until a homogeneous mixture was formed. 1.1 Parts of lauroyl peroxide and 0.6 parts by weight of mercaptan modifier are dissolved in 40 parts of styrene monomer and are added to the homogeneous mixture. After these ingredients are dispersed the agitation is continued but the temperature is raised to 81° C. for 4 hours. The temperature is then lowered to 75° C. and is maintained for an additional 3 hours. The reaction mass is removed from the reaction vessel and is placed in a suitable closed container for 17 hours at 100° C. and is then heated for 17 hours at 150° C. 5 Parts of stearic acid and 2 parts of alkylated aryl phosphite are intimately added to the above mixture.

EXAMPLE 7

Example 6 is repeated employing 121.8 parts of standard emulsion low cis content polybutadiene (cis content 8 percent, trans 74 percent, vinyl 18 percent) in place of the butadiene-styrene rubbery copolymer.

EXAMPLE 8

Example 6 is repeated employing 121.8 parts of a stereoregular 1,4-polybutadiene containing 34 percent cis content and 9 percent vinyl content in place of the butadiene-styrene copolymer.

EXAMPLE 9

Example 6 is repeated employing 121.8 parts of 1,4-polybutadiene containing 95 percent cis content and 3.3 percent vinyl content in place of the butadienestyrene rubbery copolymer.

The physical properties of the resultant products of Examples 6–9 are compared as follows:

|  | Ex. 6 | Ex. 7 | Ex. 8 | Ex. 9 |
|---|---|---|---|---|
| Impact (Izod) | 0.90 | 0.70 | 1.60 | 1.88 |
| Heat Distortion (°C. at 264 p.s.i.) ½" × ¼" bars | 66.0 | 74.0 | 70.0 | 70.0 |
| % Volatility | 1.39 | 0.20 | Not determined | 1.57 |
| Viscosity (cps) | 16.3 | 19.2 | 21.6 | 17.3 |

In Examples 10 – 12, Example 6 is repeated employing the following materials in the amounts indicated in the following table of physical properties in place of the rubbery polymer and styrene monomer employed therein.

|  | Ex. 10 | Ex. 11 | Ex. 12 |
|---|---|---|---|
| Parts butadiene-styrene copolymer | 250.0 | 184.7 | 119.3 |
| Parts 1,4-polybutadiene 95% cis content and 3.3% vinyl content | 0. | 50.0 | 100.0 |
| Parts styrene monomer | 4588.1 | 4603.4 | 4618.8 |
| Impact (½" × ⅛" bars) | 0.80 | 0.93 | 1.1 |
| Viscosity (cps) | 16.1 | 20.2 | 20.5 |
| Volatility (%) | 1.78 | 1.59 | 0.55 |
| Heat Distortion (°C. at 264 p.s.i.) ½" × ¼" bars | 66.0 | 74.0 | 74.5 |
| Elastic Mod. × $10^5$ (p.s.i.) | 3.80 | 4.0 | 3.91 |
| Elongation at fail*-(%) | 23.2 | 24.4 | 17.4 |
| Tensile at fail* - (p.s.i.) | 3555.0 | 4822.0 | 4941.0 |
| Elongation at yield*-(%) | 1.43 | 2.04 | 2.16 |
| Tensile at yield*-(p.s.i.) | 4326.0 | 4799.0 | 4997.0 |

*Employed essentially ASTM D 638 procedure.

EXAMPLE 13

Example 6 is repeated employing 190.0 parts of 1,4polybutadiene having 95 percent cis content and 3.3 percent vinyl content and 4683.1 parts of styrene monomer in place of the rubbery polymer and styrene employed therein.

EXAMPLE 14

Example 6 is repeated employing 247.5 parts of 1,4-polybutadiene having 99 percent cis content and 0.8 percent vinyl content and 4585.6 parts of styrene monomer in place of the rubbery polymer and styrene employed therein.

The following table lists the physical properties of the products of Example 13 and 14:

|  | Ex. 13 | Ex. 14 |
|---|---|---|
| Viscosity (cps) | 13.0 | 17.0 |
| Volatility (%) | 1.08 | 1.22 |
| Impact (Izod) | 1.20 | 1.40 |
| Heat Distortion (°C. at 264 p.s.i.) ½ × ¼" bars | 70.0 | 69.5 |
| Tensile at yield (p.s.i.) | 3847.0 | 3796.0 |
| Elongation at yield (%) | 1.78 | 1.93 |
| Tensile at fail (p.s.i.) | 3811.0 | 3689.0 |
| Tensile Mod. × $10^5$ (p.s.i.) | 3.57 | 3.10 |

In Examples 15 – 17, Example 6 is repeated employing amounts and particular comonomers and rubbery materials therein as shown in the following table:

|  | Ex. 15 | Ex. 16 | Ex. 17 |
|---|---|---|---|
| parts 95% cis content 1,4-polybutadiene | 121.8 | 121.8 | 121.8 |
| parts styrene monomer | 1272.6 | 1272.6 | 1272.6 |
| parts acrylonitrile | 567.9 | 0 | 0 |
| parts methylmethacrylate | 0 | 157.9 | 0 |
| parts dimethylitaconate | 0 | 0 | 567.9 |
| Impact (Izod) | 1.98 | 1.92 | 1.86 |
| Heat Distortion (°C. at p.s.i.) ½" × ¼" bars | 74.0 | 69.0 | 71.0 |
| Vicsosity (cps) | not determined | 21.2 | 18.1 |
| Volatility (%) | 1.40 | 1.57 | 1.60 |

EXAMPLE 18

7.5 parts of 1,4-polybutadiene having a cis content of 95 percent and a vinyl content of 3.3 percent is blended with 92.5 parts of commercial molding grade polystyrene pellets on a two-roll mill at a temperature of 150° C. for 20 minutes until a homogeneous mixture is obtained. The mixture is then extruded and is pelletized.

EXAMPLE 19

Example 18 is repeated employing 3.7 parts of the 1,4-polybutadiene employed therein.

EXAMPLE 20

Example 18 is repeated employing 3.7 parts of the 1,4-polybutadiene employed therein and 3.7 parts of a rubbery copolymer of butadiene and styrene (GRS).

EXAMPLE 21

Example 18 is repeated employing 7.5 parts of a rubbery butadiene-styrene (GRS) copolymer in place of the polybutadiene employed therein.

The following table lists the properties of the material produced in Examples 18 - 21.

|  | Ex. 18 | Ex. 19 | Ex. 20 | Ex. 21 |
| --- | --- | --- | --- | --- |
| Impact | 1.43 | 0.7 | 1.1 | 0.90 |
| Viscosity (cps) | 23.1 | 23 | 17.5 | 17.9 |
| Volatility (%) | 0.69 | not determined | 1.14 | 0.58 |
| Tensile at Fail (p.s.i.) | 3878 | 6000 | 3269 | 5062 |
| Elongation at Fail (%) | 19.3 | 15 | 31.4 | 22.5 |

EXAMPLE 22

The procedure of Example 3 is repeated using the following components in the polymerization:

| Component I | 94.25 parts of styrene monomer |
| --- | --- |
| Component II | 5.75 parts of "rubbery material" |

The 5.75 parts of "rubbery material" Component II is made up of a combination of the following: 0–100 percent of A - consists of a stereoregular 1,4-polybutadiene having 96 percent cis, 1 percent trans and 3 percent vinyl content, and the remainder of Component II is made up of B - a butadiene-styrene copolymer of the "GR-S type," which is an emulsion polymerization product having 22–24 percent styrene, sold as Goodyear 1006.

The end polymer compositions are evaluated for Izod impact employing American Standards for Testing Materials Test D 256-56. The test specimens are prepared following the procedure of ASTM Test D 1892 - 61T by the compression molding procedure, as directed therein under section 4.

The runs of the experiment and the evaluation of the products thereof including impact strengths are set forth in the following table:

| Run Number | Composition of Component II (Rubbery Material) | | Viscosity (cps) | Impact Strength (ft.-lbs./ in. notch) |
| --- | --- | --- | --- | --- |
|  | %A | %B |  |  |
| I (control) | — | 100 | 23.4 | 1.13 |
| II | 20 | 80 | 25.7 | 1.52 |
| III | 40 | 60 | 24.9 | 1.73 |
| IV | 60 | 40 | 21.8 | 1.81 |
| V | 80 | 20 | 20.9 | 1.56 |
| VI | 100 | — | 17.8 | 1.44 |

The above experiment is repeated using again a 5.75 percent total rubber material concentration (Component II). The tensile values of the products are determined on injection molded specimens (ASTM D 1892-61T). The Runs of the experiment and the evaluation of the products are summarized in the following table:

| Run No. | Rubber Component Employed | | Elongation at Fail (%) | Tensile at Fail (psi) |
| --- | --- | --- | --- | --- |
|  | %A | %B |  |  |
| I | — | 100 | 35.7 | 4423 |
| II | 25 | 75 | 41.0 | 4245 |
| III | 50 | 50 | 48.9 | 4083 |
| IV | 100 | — | 54.3 | 3623 |

EXAMPLE 23

The process of Example 3 is again employed. In the Runs of the experiment (Runs I - IV), the following rubber components are employed to provide a total rubber concentration of 5.75 percent, based on the total polymer composition:

Run I (control) - 5.75 percent of the GR-S-type rubber product Goodyear 1006 is employed Run II - 5.75 percent of a rubber consisting of an emulsion-type polybutadiene sold under the designation Goodyear 5,000 is employed.

This polymer has a vinyl content of 17 percent and a cis content of 17.8 percent (greatly in excess of 10 percent).

Run III - 5.75 percent of a stereoregulated 1,4-polybutadiene is employed having a vinyl content of 7.8 percent and a cis content of 35.9 percent. It is seen that this polybutadiene has a greater than 25 percent cis content but a less than 10 percent vinyl content. This product is sold under the designation Diene 35NF.

Run IV - 5.75 percent of a stereoregular 1,4-polybutadiene is employed having a cis content of 95.4 percent and a vinyl content of 2.7 percent. This product is sold under the designation ASRC Cisdene.

The Runs and the evaluation results are listed in the following table:

| Run No. | Rubber Component Employed | | Viscosity (cps) | Impact Strength (ft.-lbs./ in.-notch) |
| --- | --- | --- | --- | --- |
|  | cis% | vinyl% |  |  |
| I (control) | GR-S-type rubber (22–24% styrene) | | 27.3 | 1.35 |
| II | 17.8 | 17.0 | 25.7 | 1.35 |
| III | 35.9 | 7.8 | 24.3 | 1.96 |
| IV | 95.4 | 2.7 | 26.7 | 2.02 |

EXAMPLE 24

Into a suitable reaction vessel are added 121.8 parts of 95 percent cis content, 2 percent vinyl content 1,4-polybutadiene 1840.5 parts of styrene monomer, 4 parts of a conventional plasticizer and 3 parts of a conventional antioxidant. The reaction mass is polymerized with agitation at 95° C. for 10 hours. The reaction mass is removed from the mixing vessel and placed in a closed container for 17 hours at 100° C. and 17 hours at 150° C.

The resultant polymer had the following properties:

| Impact (Izod) | 1.77 |
| --- | --- |
| Heat Dist. (°C. at 264 p.s.i. ½ × ¼" bars) | 69.5 |
| Viscosity (cps) | 19.3 |
| Volatility (%) | 0.90 |

EXAMPLE 25

Quantities of small particles of the high impact compositions of this invention provided by the above examples are impregnated with n-pentane by tumbling therewith 7 parts of n-pentane per 100 parts of polymer in a pressurized vessel for several hours to obtain an even distribution of the blowing agent throughout the polymer particles.

EXAMPLE 26

The impact polymer compositions of this Example in the form of polymer beads are provided by the following procedure: six parts of rubber are dissolved in 94 parts styrene at a temperature of about 100° C. and the mixture is polymerized at about 100° C. until the polymer content of the polymerization mixture reaches a value of at least 35 to about 50 percent by weight. The polymerization mixture is then suspended in about equal parts by weight of an aqueous suspension polymerization medium containing a small amount of polyvinyl alcohol. Suspension polymerization is carried out using peroxide catalyst at suitable temperatures of at least 110° C. until the polymerization is completed. The final polymer product present in the form of polymer beads is separated by centrifugation.

Volatility content (being mostly water) of the centrifuged polymer bead product produced by this procedure using SB-R rubber (Goodyear 1006) is approximately 500 percent that of polymer beads coming within the present invention using as the rubbery polymer a stereoregular polybutadiene having about 98 percent cis content and about 1 percent vinyl content.

Other compounding ingredients such as conventional anti-oxidants and plasticizers may be incorporated into the compositions of this invention. Thus, up to 2 percent by weight based on the weight of the polymer composition may be used of an anti-oxidant to prevent possible degradation of the rubbery material. Examples of such anti-oxidants include 2,6-di-tert-butyl-4-methyl phenol and alkylated aryl phosphites. A plasticizer in an amount up to about 5 percent by weight, as for example butyl stearate, may be similarly used to impart desirable flow and molding properties to the finished product.

Catalysts that may be used are the free radical polymerization catalysts commonly used in ordinary styrene polymerizations. Example of these include tertiary butyl peracetate, tertiary butyl perbenzoate, di-t-butyl peroxide, 2,4-dichloro benzoyl peroxide, p-chlorobenzoyl peroxide, acetyl peroxide, caprylyl peroxide, methyl ethyl ketone peroxide, hydroxyheptyl peroxide, 2-azo-bis-isobutyronitrile and lauroyl peroxide. Minimum concentrations catalysts are preferred in practicing this invention. Products of highest clarity are obtained when the monomer polymerizes thermally in the presence of rubber in the absence of catalysts. However, some monomers and some rubbers often contain traces of inhibitors which interfere with thermal polymerization and therefore small quantities of catalysts can be incorporated in the formulation to overcome the effect of these inhibitors.

Normal polymerization conditions may be employed in the practice of this invention. Thus, as is often preferred, each polymerization stage can be carried out under a blanket of nitrogen. The times and temperatures of polymerization may vary and are governed by the properties desired in the finished product. For example, each batch of monomer may be polymerized at one particular temperature or may be polymerized in various selected temperature stages. In general, since the polymerization is exothermic, the rate of polymerization is restricted by the rate the heat can be removed from the polymerizing mass so that the nature and particular design of the equipment used as well as the desired properties of the final impact polymer compositions influences the time-temperature conditions selected to employ in a polymerization.

Many changes and alterations may be made without departing from the spirit and scope of this invention, as set forth in the appended claims.

We claim:

1. A moldable monovinyl aromatic polymer composition formed by the polymerization of (a) at least one monovinyl aromatic monomer, (b) 0 to about 30 percent by weight of the total monomer weight of a copolymerizable monomer of the group consisting of esters of acrylic and methacrylic acids, acrylonitrile, and esters of itaconic acid, and (c) a rubbery 1,4-polybutadiene, (1) by dissolving said rubbery 1,4-polybutadiene in said monomers and (2) by polymerizing said monomers under free-radical polymerization conditions until the polymerization of said monomers is substantially completed, said polymerization carried out employing mass polymerization techniques under agitation conditions to provide a dispersed and substantially uniform composition; said 1,4-polybutadiene being present in an amount of from 1 percent to about 20 percent, based on the total final polymer composition weight, said amount of 1,4 polybutadiene being effective in substantially enhancing the impact value of said polymer composition, and said 1,4-polybutadiene characterized by having a cis butadiene content of at least 25 percent and a 1,2-addition butadiene content of not more than about 10 percent based on the weight of said 1,4-polybutadiene.

2. The moldable polymer composition of claim 1 wherein said 1,4-polybutadiene has a minor content greater than 25 percent of cis butadiene and a 1,2-addition butadiene content of less than about 10 percent.

3. The moldable polymer composition of claim 2 wherein said 1,4-polybutadiene has a cis butadiene content of about 35 percent.

4. The moldable polymer composition of claim 1 wherein said 1,4-polybutadiene has a cis butadiene content of about 95 percent.

5. The moldable polymer composition of claim 1 wherein said 1,4-polybutadiene is present in an amount of from 1 to about 10 percent based on the total polymer weight.

6. The moldable polymer composition of claim 1 wherein another rubbery polymer of a conjugated diene having 4-6 carbon atoms is used in place of a portion of said rubbery 1,4-polybutadiene not to exceed 80 percent thereof by weight, provided said rubbery 1,4-polybutadiene is present in an amount of at least 1 percent based on the total polymer weight.

7. The moldable polymer composition of claim 6 wherein GR-S rubber is present as said other rubbery polymer.

8. A moldable styrene polymer composition formed by the polymerization of styrene monomer in the presence of rubbery 1,4-polybutadiene (1) by dissolving said rubbery 1,4-polybutadiene in said styrene monomer and (2) by polymerizing said styrene monomer under free-radical polymerization conditions until the polymerization of said styrene monomer is substantially completed, said polymerization carried out employing mass polymerization techniques under agitation conditions to provide a dispersed and substantially uniform composition; said 1,4-polybutadiene being present in an amount of from 1 percent to about 20 percent, based on the total final polymer composition weight, said amount of 1,4-polybutadiene being effective in substantially enhancing the impact value of said polymer composition, and said 1,4-polybutadiene characterized by having a cis butadiene content of at least 25 percent and a 1,2-addition butadiene content of not more than about 10 percent, based on the weight of said 1,4-polybutadiene.

9. The moldable styrene polymer composition of claim 8 wherein the 1,4-polybutadiene employed has a minor percentage greater than 25 percent of cis butadiene content and a 1,2-addition butadiene content of less than about 10 percent.

10. The moldable styrene polymer composition of claim 9 wherein the 1,4-polybutadiene has a cis butadiene content of about 35 percent.

11. The moldable styrene polymer composition of claim 8 wherein the 1,4-polybutadiene employed has a major content of cis butadiene units and a 1,2-addition butadiene content of less than about 10 percent.

12. The moldable styrene polymer composition of claim 11 wherein the 1,4-polybutadiene employed has a cis butadiene content of about 95 percent.

13. The moldable styrene polymer composition as defined in claim 8 wherein said 1,4 polybutadiene is present in an amount of from 1 to about 10 percent based on the total polymer weight.

14. The moldable styrene polymer composition as defined in claim 13 wherein said 1,4-polybutadiene is present in an amount of at least 190 parts by weight per 4683.1 parts by weight of said styrene monomer.

15. A moldable styrene polymer composition formed by the polymerization of styrene monomer in the presence of rubbery 1,4-polybutadiene (1) by dissolving said rubbery 1,4-polybutadiene in said styrene monomer and (2) by polymerizing said styrene monomer under free-radical polymerization conditions until the polymerization of said styrene monomer is substantially completed, said polymerization carried out employing mass polymerization techniques under agitation conditions to provide a dispersed and substantially uniform composition, said 1,4-polybutadiene being present in an amount of 121.8 parts by weight per 1840.5 parts by weight of said styrene monomer, said amount of 1,4-polybutadiene being effective in substantially enhancing the impact value of said polymer composition, and said 1,4-polybutadiene characterized by having a cis-butadiene content of at least 25 percent and a 1,2-addition butadiene content of not more than 10 percent, based on the weight of said 1,4-polybutadiene.

16. The moldable styrene polymer composition as defined in claim 15 wherein said 1,4-polybutadiene has a cisbutadiene content of 34 percent and a 1,2-addition butadiene content of 9 percent.

17. A moldable styrene polymer composition as defined in claim 15 wherein said 1,4-polybutadiene has a cisbutadiene content of 95 percent and a 1,2-addition content of 3.3 percent.

* * * * *

UNITED STATES PATENT OFFICE
CERTIFICATE OF CORRECTION

PATENT NO. : 3,868,434
DATED : February 25, 1975
INVENTOR(S) : Richard C. Westphal and Paul Heinig It is certified that error appears in the above-identified patent and that said Letters Patent are hereby corrected as shown below:

In the ABSTRACT, line 4, after "by weight" insert -- based --.
In column 1, line 46, "composition" should read -- compositions --; line 67, "freeradical" should read -- free-radical --.
In column 2, line 6, "rubber" should read -- rubbery --; line 57, after "such as" insert -- a --.
In column 3, line 56, "close" should read -- closed --.
In column 4, line 48, "composed" should read -- compared --; line 57, "10 1/2" should read -- 1/2 --.
In column 5, line 31, "butadienesty-" should read -- butadiene-sty- --.
In column 6, line 45, before "p.s.i." insert -- 264 --.
In column 8, line 22, "5,000" should read -- 5000 --.
In column 9, line 54, before "catalysts" insert -- of --.
In column 12, line 24, before "10" insert -- about --; line 32, "cisbutadiene" should read -- cis-butadiene --.

In Column 10, claim 4, line 2, after "has" insert --1, 2-addition butadiene units present in a low amount not more than about 10% and --.

In column 10, claim 4, line 3, before "about", insert --up to--.

Signed and Sealed this twenty-third Day of March 1976

[SEAL]

Attest:

RUTH C. MASON
Attesting Officer

C. MARSHALL DANN
Commissioner of Patents and Trademarks